United States Patent [19]

Hallerbäck

[11] Patent Number: 4,600,400

[45] Date of Patent: Jul. 15, 1986

[54] WHEEL-SHAPED OBJECTS

[75] Inventor: Stig Hallerbäck, Västra Frölunda, Sweden

[73] Assignee: Aktiebolaget SKF, Goteborg, Sweden

[21] Appl. No.: 751,441

[22] Filed: Jul. 3, 1985

[30] Foreign Application Priority Data

Sep. 5, 1984 [SE] Sweden ................................ 8404438

[51] Int. Cl.$^4$ ............................................. F16H 55/36
[52] U.S. Cl. .................................. 474/166; 474/174; 474/902
[58] Field of Search ............... 474/174, 176, 166, 161, 474/152, 902

[56] References Cited

U.S. PATENT DOCUMENTS 3,137,177  6/1964  Barnett ................................ 474/174
3,610,066 10/1971  Rychlik .......................... 474/161 X Primary Examiner—James A. Leppink
Assistant Examiner—Frank McKenzie
Attorney, Agent, or Firm—Eugene E. Renz, Jr.

[57] ABSTRACT

The invention refers to wheel-shaped objects such a pulley discs, which incorporate a rigid internal hub, a rigid outer circumferential part and a web interconnecting these parts and being of a material which has a higher coefficient of thermal expansion than the hub and the circumferential part.

The invention is characterized therein that the web portion in circular cross-section has a zigzag-like design and that through-grooves are made in the web portion, where this connects to the circumferential part, thus that the material of the web portion at cooling can disengage itself from the circumferential part at these grooves thereby to prevent not desired tensile stresses to develop.

3 Claims, 2 Drawing Figures

WHEEL-SHAPED OBJECTS

The present invention refers to a device at wheel-shaped objects and it particularly relates to pulleys and the like.

Wheels as known incorporate an outer circumferential portion, which can be named the race, an inner, central portion, which is called the hub, and a part which interconnects these two portions, and can be referred to as a web portion. The web portion can be spokes, disks or the like. The parts of the wheel on which the biggest demands are generally put are the race and the hub, whereas the purpose of the web portion is to interconnect these parts only. The race and hub are, therefore, often made from a more rigid and more expensive material than the web portion, e.g. steel. It is convenient to have the hub made from steel, as the shaft on which the hub is fitted is generally made from steel, and the hub will then have the same coefficient of thermal expansion as the shaft. For the race it is also generally convenient to use steel, as it is wear resistant and heat, which has been generated thereon, can easily be given off to the surroundings.

As lower requirements can be put on the web portion in comparison with the hub and the race it has been tried to use less expensive materials such as plastic material for this part. The plastic material has low weight, it is easily molded and it has thereabove many good properties, but unfortunately it has a much bigger coefficient of thermal expansion than steel. This means that when a hub from steel or steel-like material by means of plastic which is molded shall be connected to a circumferential part made from steel, then the plastic material during cooling after the molding will shrink more than the steel parts, and big tensile stresses will occur in the plastic material. This inevitably results in cracks in the plastic material particularly at its connection to the hub.

Another drawback with plastic material is that this material generally has very poor heat resistance. It is, therefore, suitable when plastic material is used for the web portion of a wheel not to choose the most simple shape of a disk but to allow the disk to be folded in a suitable manner thus that cooling channels are formed, which, due to the effect of the centrifugal force, throw air outwards.

It has thus since long been a desire to be able to produce a wheel having a rigid outer race and a correspondingly rigid interior hub, which are interconnected by means of a less expensive material such as plastic material. This has almost been considered as an impossibility, as the tensile stresses are believed to occur in the web portion if plastic material having a big coefficient of thermal expansion is used for this part.

According to the invention, the above problem has, however, been solved thereby that there is provided a device at wheel-shaped objects such as pulleys, which incorporates a rigid interior hub, a rigid outer circumferential part and therebetween an interconnecting web portion made from a material having a higher coefficient of thermal expansion than said hub and said circumferential portion, and which is characterized thereby that the web portion in circular cross-section has a zigzag-like design and that the web portion material is provided with through grooves arranged alternatively on both sides of the circumferential part, wherein the material of the web portion encloses the circumferential part thus that the material of the web portion during cooling can disengage itself from the circumferential part at these grooves, whereby the development of undesired tensile stresses is prevented.

According to the invention it is convenient that the grooves are shaped as circular segments, and it is also convenient if these grooves on both sides of the circumferential part, partly overlap each other.

The invention hereinafter will be further decribed with reference to the drawings in which.

Figure 1:
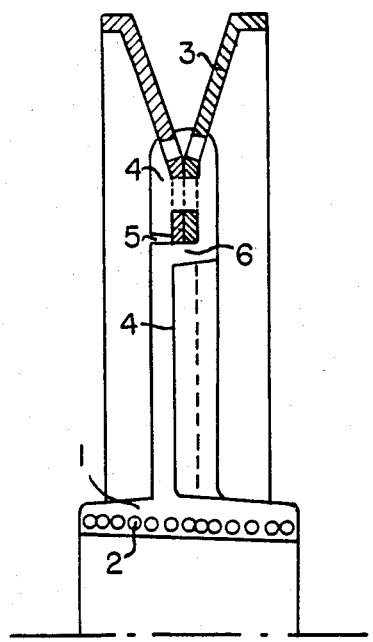
FIG. 1 shows a radial section through a grooved pulley.

FIG. 1 shows a grooved pulley having a hub 1. This hub 1 has been molded in plastic material but a steel helix 2 has been introduced into the hub during the molding whereby the thermal expansion properties of the hub will follow that of steel.

The grooved pulley according to FIG. 1 has an outer circumferential part or race 3 made from steel. This race 3 is at its inner portion embedded in plastic material 4, which extends into the hub and interconnects the hub and the race. The part of the plastic material, which encloses and anchors the steel part 3 after the molding, will follow the movement of the steel during cooling, whereas a part of the plastic material, located as a disk between the steel part and the hub, will try to shrink in accordance with the properties of the plastic material, which it cannot do, as the hub 1 and also the race 3 will hold it in position. Tensile stresses will then occur in the plastic material.

In order to avoid these tensile stresses there has according to the invention been provided grooves 5 in the plastic embedding at the internal edge of the circumferential part. These grooves extend all the way into the steel material and expose this.

As the web portion of plastic material 4 is made with a zigzag-shaped design as seen in a circular cross-section, the web portion will reach the outer part alternatively on one and the other side thereof. This then results in that, after the groove 5 has been made, there is formed a knee 6 in the structure. As the plastic material has but little adherence to steel, during the cooling after molding, the plastic material in the web portion will be able to shrink as the groove 5 interrupts the connection outwards and the knee 6 allows a bending motion.

The web portion of plastic material reaches the outer part 3 (FIG. 1) alternatively on the left and alternatively on the right hand side. The grooves 5 are thus also arranged alternatively on the left hand or right hand side according to FIG. 1.

Figure 2:
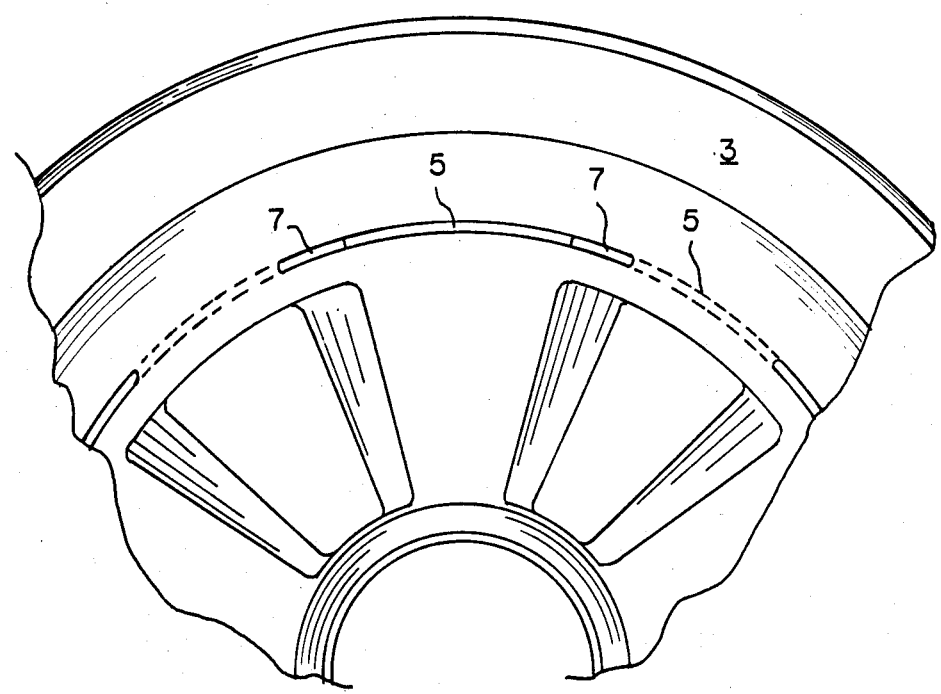
FIG. 2 shows a side view of a portion of the same pulley.

The design of the web portion is not critical. In the present case, as best shown in FIG. 2, it is made as channels which extend outwards. Cooling air will then flow outwards when the wheel rotates and it will remove heat generated at the steel race 3. This cooling effect is improved by the grooves 5 as these bring about an interruption in the heat transport through the plastic material inwards against the hub.

As mentioned above, the web portion may have a zigzag-like design in circular cross-section. It can also have a true zigzag-shape or any other shape, and in extreme cases it can be made as a part of a zig-zag line. This means that in such a case the web portion will become plane and will reach the outer portion on one side only and then we will have a single circumferential groove 5. It is, however, advantageous from symmetry aspects that the grooves are located on both sides. This also facilitates the manufacture, as the outer part 3 of steel can be retained in the mold by the mold inserts which creates the grooves 5.

Such as shown in FIG. 2 the grooves 5 are preferably made as circular segments. These should overlap each other somewhat such as shown with numeral 7 in order to obtain a suitable elasticity.

The invention is not limited to the embodiment shown but can be modified in different manners within the scope of the appended claims.

What is claimed is:

1. A wheel-shaped object such as a pulleys, incorporating a rigid, interior hub (1) a rigid outer circumferential portion (3) and therebetween an interconnecting web portion (4) made from a material having a higher coefficient of thermal expansion than said hub (1) and said circumferential portion (3), characterized therein, that the web portion (4) in circular cross-section has a zigzag-like design and that the web portion (4) material is provided with through-grooves (5) arranged alternatingly on both sides of the circumferential portion (3), wherein the material of the web portion (4) encloses the circumferential portion (3) thus that the material of the web portion (4) during cooling can disengage itself from the circumferential part (3) at these grooves (5), whereby the development of undesired tensile stresses is prevented.

2. A device according to claim 1 characterized therein, that the grooves (5) are shaped as circular segments.

3. A device according to claim 1, characterized therein, that the grooves (5) on both sides of the circumferential part (3) are arranged partly to overlap each other.

* * * * *